United States Patent [19]

Stunkard

[11] Patent Number: 4,637,421
[45] Date of Patent: Jan. 20, 1987

[54] IN-LINE REPAIRABLE TOP ENTRY BALL VALVE

[76] Inventor: Gerald A. Stunkard, P.O. Box 748, Gladewater, Tex. 75647

[21] Appl. No.: 863,361

[22] Filed: May 15, 1986

[51] Int. Cl.$^4$ ............................................. F16K 43/00
[52] U.S. Cl. ................................... 137/327; 251/315; 251/317; 137/72
[58] Field of Search .................. 137/72, 74, 315, 327; 251/315, 316, 317

[56] References Cited

U.S. PATENT DOCUMENTS

| | | | |
|---|---|---|---|
| 3,038,489 | 6/1962 | Allen | 251/315 X |
| 3,154,094 | 10/1964 | Bredtschneider | 137/315 |
| 3,480,253 | 11/1969 | Priese | 251/315 X |
| 3,771,545 | 11/1973 | Allen | 251/316 X |
| 3,895,776 | 7/1975 | Laurens | 251/315 |
| 4,332,370 | 6/1982 | Williams | 137/72 X |
| 4,523,608 | 6/1985 | Miller | 137/315 |

FOREIGN PATENT DOCUMENTS 2328995  1/1974  Fed. Rep. of Germany ...... 251/315

Primary Examiner—Harold W. Weakley

[57] ABSTRACT

An in-line repairable top entry floating ball valve having internal components that are replaceable through an access opening, closed by a valve bonnet, while the valve body is located within a flow line. The valve mechanism is provided with seats which may be of resilient nature and are sealed with respect to the spherical plug member by means of ball/seat spaces having interference sealing engagement between the plug and seats. The ball/seat spacers form sealing surfaces at one axial end for sealing engagement with the spherical plug member and sealing surfaces at the opposite axial end for sealing engagement with the seats and in spherically concentric relation with the plug to thus permit installation and removal of the ball/seat spacers in an arcuate motion about the spherical surface of the plug. With the stem in horizontal position and the plug member in closed position, the plug member is supported by the operating stem and a guide pin to prevent misalignment of the plug member while permitting the plug member to float downstream under the influence of pressure. The valve mechanism provides effective fire-safe sealing in the event the seats and seals of the valve become destroyed by excessive heat.

41 Claims, 10 Drawing Figures

IN-LINE REPAIRABLE TOP ENTRY BALL VALVE

FIELD OF THE INVENTION

This invention relates generally to top entry type ball valves and more particularly to an in-line repairable top entry floating ball valve wherein the ball or spherical plug is guided during floating movement and the valve is readily adaptable for fire-safe service.

BACKGROUND OF THE INVENTION

A spherical plug valve, also known as a ball valve, includes a body structure within which is movably located a plug member or ball having a through passage and defining a spherical sealing surface. The ball may have any suitable means for connecting to an operative stem to provide rotational movement of the ball. Ball valves are provided with seat members which are typically movable within the valve body and which establish sealing engagement with the spherical sealing surface of the ball and a sealing surface formed in the body, thus controlling the flow of product, such as liquids or gases, downstream of the valve when the ball is in the closed position. The seat members are of circular form having typically an internal conical configuration or an internal spherical concave configuration for sealing engagement with the spherical sealing surface of the ball and a sealing surface conforming to a sealing surface in the body.

The majority of ball valves currently used in industry are designed with two or three piece body structures, enabling body sections to be separated for ease of removing the ball and seat elements. However, two or three piece body structures are not entirely satisfactory because body leakage can occur at body seals and the valve body structure may not be capable of withstanding significant line stresses which are prevalent in piping systems controlled by such valves. Also, two or three piece body style valves require removal from the piping system for maintenance, thus increasing cost of time for maintenance and longer system shutdown time. Thus, it is desirable to be able to utilize a valve assembly that is repairable without the requirement of removing the valve from the piping system.

Typically, what is referred to as top entry type ball valves, provide the ability to accomplish such maintenance while the valve is retained in-line, thus minimizing cost of time for maintenance and system shutdown time. Top entry type ball valves have been used for a considerable period of time and are considered to minimize many of the undesirable features of ball valves having sectioned body structures. The advantages of top entry type ball valves include a one piece body structure that will withstand line stresses and with no body joints for the possibility of leakage due to body seal failure. The circular seats of ball valves establish sealing contact with the spherical surface of the ball, requiring the end faces of the seat rings to extend over the spherical surface of the ball in both closed and open positions of the ball. The ball is therefore contained within the inner circumferential sealing point of the seat rings.

Some top entry type ball valves have circular recesses incorporated within the valve body to receive the seat rings. It is difficult therefore to achieve retraction of the seat rings to a position sufficient to provide clearance for installation or extraction of the ball. Normally, this requires the need for special tools and/or additional holes through the valve body wall for insertion of special tools. These special tools are typically of the type that maintenance personnel will not ordinarily possess. Additional holes through the valve body wall require plugging and present potential hazardous leakage points to the atmosphere, which could develop due to improper plugging or due to corrosion of the plugs or wall structure adjacent the plugs. Also, manufacturing costs are significantly increased when such valve body plugs are employed. Other designs of top entry type ball valves omit the circular seat recesses in the body and require an opening of excessive diameter or size in the top of the body sufficient in size to permit installation or extraction of the seat rings and ball simultaneously. The aforementioned excessive large opening in the top of the body creates an increased effective sealing area of the bonnet seal, therefore usually requiring additional bolting to secure the bonnet to the body sufficient to withstand the internal pressure acting against the increased effective sealing area of the bonnet seal. Also, this requires additional material in the body and bonnet to develop increased costs of material and manufacturing. In certain sizes and pressure classes of ball valves with this type of construction, limitations can be realized due to the increased size of the outer configuration of the body and bonnet interfering with the end flanges integral with the body and conforming to flange face to face dimensions as specified by industry standards. These disadvantages have significantly retarded wide use of top entry type ball valves in the past.

SUMMARY OF THE INVENTION

It is therefore a principle objective of the present invention to provide a novel in-line repairable top entry floating ball valve for piping installations requiring means for controlling the flow of liquids or gases.

It is also a feature of the present invention to provide a novel in-line repairable top entry floating ball valve incorporating replaceable seat rings being contained within body seat recesses.

It is also a feature of the present invention to provide a novel in-line repairable top entry floating ball valve incorporating replaceable ball/seat spacers and means to position and retain said ball/seat spacers simply and effectively.

It is also a feature of the present invention to provide a novel in-line repairable top entry floating ball valve to include means for efficiently inserting or removing the ball/seat spacers to provide sufficient clearance for installation or extraction of the ball within the valve body.

Another feature of the present invention is the provision of a novel in-line repairable top entry floating ball valve requiring an opening in the top of the body to be of a minimum diameter or size sufficient only to permit passage of the ball therethrough, thus reducing to a minimum, the effective bonnet seal area, bonnet bolting requirement and material mass.

It is an even further feature of this invention to provide a novel in-line repairable top entry floating ball valve with unique fire-safe features.

Briefly, the present invention is directed to a novel in-line repairable top entry floating ball valve mechanism which may be efficiently assembled and disassembled through the use of simple and conventional wrenches and tools such as adjustable opening wrenches, box end wrenches, open end or socket wrenches, screw drivers or any other similar tool suitable for light prying. This ball valve invention is specifically designed to eliminate the necessity for any special wrenches or tools and to eliminate any holes through the valve body wall which must be plugged.

The valve body is of one piece construction and offers maximum resistance to stresses developed from piping conditions such as bending, expansion and contraction. Also, the efficient design of the valve body structure promotes simple and economical manufacturing, assembly and maintenance of the ball valve. Piping end connections integral with the valve body may be of various configurations such as, flanged, threaded, socket weld, butt weld, etc. The valve body forms a top entry access opening at its upper extremity of minimal dimension to permit passage of seat rings, ball/seat spacers and ball during assembly or disassembly procedures. The minimal dimension of the top opening reduces size requirement of the outer configuration of the body and bonnet, thus eliminating any possible interference with the end flanges integral with the valve body and further permitting the ability to design and produce the ball valve in all sizes and pressure classes with flange face-to-face dimensions conforming to all industry standards. The top entry opening includes provision for body internal pressure sealing with respect to the bonnet by a variety of sealing element options such as elastomeric O-rings, asbestos gasket, Grafoil ® gasket, metal gasket, etc. In addition, secondary metal-to-metal sealing, developing a fire-safe feature of the ball valve mechanism, is created by a precision machined surface on the upper portion of the body that corresponds with a similar precision machined surface on the lower portion of the bonnet flange. Bolts or cap screws extend through the bonnet flange in conventional manner to thus provide for mechanically retained assembly of the bonnet to the valve body.

The flow ports or passages of the body structure are defined in part by cylindrical recesses which receive the seat rings with an axially slidable fit. Each seat recess is formed in part by a radial abutment surface machined to a finish suitable for sealing engagement with the rear face of the seat ring and further provides metal-to-metal sealing with the ball/seat spacer for fire-safe conditions. Adjacent to the aforementioned seat recesses and in conjunction therewith, semi-circular recesses of identical inside diameters as the seat recesses, are formed in the lower portion of the valve body chamber inwardly toward the ball. The spans or openings of the semi-circular recesses are required to be at least even with the horizontal center line of the respective seat recess and preferably one-eighth to one-quarter inch below said horizontal center line. Each said semi-circular recess receives a ball/seat spacer which is described below. The semi-circular configurations support and retain the ball/seat spacers in a manner to prevent any downward movement or any lateral movement during rotation of the ball. A receptacle is formed centrally in the lower portion of the body chamber to receive a round and elongated pin for positioning and guiding the ball, the purpose of which is explained later.

The bonnet is mounted on top of body with four or more standard hex head (or other style) bolts (cap screws) or studs with hex nuts, by protruding through clearance holes in the bonnet flange and threaded into mating holes in the top of body. A through bore to receive the stem is centrally located in bonnet. This bore has a larger diameter at lower area of the bonnet and an internal conical shaped precision machined shoulder is created by the reduction of bore size in the intermediate area for the engagement of a stem thrust bearing and seal and also ensures prevention of stem blow-out and further provides metal-to-metal sealing for fire-safe conditions. An enlarged bore diameter may be added in the upper area to receive stem sealing elements such as chevron "V" style or solid packing rings. Provisions for adjustment of said packing rings may also be present on the upper side of the bonnet. A circular rim is incorporated on the lower portion of the bonnet with a diameter of sufficient size to extend adjacently over the outside diameters of the positioned ball/seat spacers. It is preferred that a clearance of 0.005 to 0.010 inches be provided between the edge of said rim and the outside diameters of the ball/seat spacers when the bonnet is joined to the body to eliminate any possibility of interference that could prevent the ball/seat spacers from floating axially within their respective semi-circular recesses. Also, upward movement of the ball/seat spacers is prevented by the bonnet rim.

The replaceable seat ring is of cylindrical shape, having an outside diameter preferably 0.002 to 0.005 inches smaller than the inside diameter of the seat recesses formed in the valve body and having an internal conical shaped, or an internal convex shaped, or an internal spherical concave shaped sealing surface on the side engaging the ball/seat spacer and an outer circular flat sealing surface on the opposite side engaging the radial abutment surface of the seat recess formed in the body chamber. Radially inward of the flat sealing surface is a circular relieved area providing clearance for the flexing of the resilient seat ring material created by preferred interference of the ball/seat spacer during assembly of same, thus creating an initial sealing condition for effective low pressure sealing. The seat ring is constructed of resilient material such as Nylon ®, Delrin ®, Teflon ®, or other desirable materials for positive bubble-tight seat sealing against the spherical convex sealing surface of the ball/seat spacer and the radial abutment surface of the seat recess formed in the body chamber. For high temperature service, a similar shaped seat ring constructed of Grafoil ® or soft graphite, in conjunction with a belleville type spring positioned between the flat sealing surface and the radial abutment surface of the seat recess, for the purpose of developing a preload or interference condition of the seat ring, may be utilized.

The replaceable ball/seat spacer of this invention is of cylindrical shape having an outside diameter not exceeding the inside diameter of the semi-circular recesses in the lower portion of the valve body chamber and preferably 0.002 to 0.005 inches smaller, and having an external spherical convex shaped sealing surface on the end engaging the seat ring. The spherical convex sealing surface has a spherical shape of true sphericity within 0.001 to 0.002 inches and being spherically concentric with the spherical shape of the ball within 0.001 to 0.004 inches to assure accurate positioning and positive sealing with the seat rings and ball. Either an internal spherical concave or conical shaped surface is provided on the opposite end facing the spherical surface of the ball. Either internal spherical concave or conical surface contains a cylindrical shaped ball seal recess to receive a short length, tubular shaped, sealing element of resilient material such as Nylon ®, Delrin ®, Teflon ®, or other desirable materials, for positive bubble-tight sealing against the spherical surface of ball. Further, either internal surface provides secondary metal-to-metal sealing engagement with the spherical surface of the ball for fire-safe conditions. As an option, the ball seal recess may be omitted and either a plain internal spherical concave or conical shaped sealing surface engaging the spherical surface of the ball may be utilized for metal-to-metal sealing for high temperatures, such as for steam service. The required overall length of the ball/seat spacer is determined by the space measurement from the tangent sealing point of the ball to the tangent sealing point of the seat ring with preferably 0.002 to 0.005 inches added to develop an interference condition to create initial sealing. A circumferential groove is located on the outside diameter of the ball/seat spacer for engagement of a screw driver or any other suitable prying tool to assist in removal of the ball/seat spacer.

The floating ball has a spherical shape of true sphericity within 0.001 to 0.002 inches to assure accurate positioning and positive sealing with the ball seal ring in the mating faces of the ball/seat spacers or metal-to-metal sealing with the plain sealing surfaces of same. A through cylindrical port, which may be of the same dimension as the dimension of the flow passage, is centrally located in relation to the spherical shape of the ball.

On the spherical surface and at 90° to the axis of the through port hole of the ball are two opposing identical rectangular recesses or slots with a depth sufficient for engagement of a tongue or key on the bottom end of stem in one of the recesses and engagement of the ball guide pin in the opposite recess. The axes of the recesses are positioned at 90° to the axis of the through port hole in the ball. During stem and ball rotation, this permits certain misalignment of the axes of the recesses in relation to the axes of the stem and ball guide pin, that may be created by manufacturing tolerances and assembly of the bonnet to the body. In addition, the floating ball, when in closed position, is free to move downstream by pressure inducement to develop positive sealing with the ball seal ring in the mating face of the downstream ball/seat spacer or metal-to-metal engagement with the mating face for firesafe conditions, or metal-to-metal sealing with a plain sealing surface for high temperatures, such as for steam service. Also, any pressure induced downstream movement of the ball when in closed position, will not develop any side thrust forces against the stem or ball guide pin.

The stem is of cylindrical shape with a large diameter at the lower end that creates a shoulder for engagement of a stem thrust bearing and seal. Also, this shoulder provides a stem blow-out proof safety feature. A small precision machined conical surface, matching the conical angle of the internal shoulder of the larger stem bore in the bonnet, is formed on the periphery of the stem shoulder to provide positive metal-to-metal sealing with the bonnet for fire-safe conditions. The lower end of the stem has a rectangular tongue or key configuration for engagement with one of the recesses or slots in the ball with a preferable 0.001 to 0.003 inches clearance for free movement of the ball. The upper stem section may have circumferential grooves to receive elastomeric seals such as O-rings or other styles of seals. Also, provisions for various types of stem packing may be incorporated for severe or high temperature service. The upper end of the stem projects through and above the bonnet a sufficient length for adaption of a lever or gear operator for manual operation, or an actuator for power actuation, as required to rotate the ball to its open and closed positions. Adaption may be of a variety of methods such as, keyed, pinned, square or hex drive, etc. Since the stem is separate from the ball, it becomes radially pressure balanced, thus side loading of stem against the stem bore in the bonnet is eliminated.

The stem thrust bearing and seal is constructed of a low friction resilient material such as Nylon®, Delrin®, Teflon®, etc., and is of cylindrical shape with a flat surface developing positive sealing engagement with the stem shoulder on one end, and a conical surface matching and developing positive sealing engagement with the conical surface of the internal shoulder of the larger stem bore in the bonnet, on the opposite end. A metallic, graphite or Grafoil® material may be utilized for high temperature service.

A cylindrical and elongated shaped ball guide pin is positioned in the aforementioned receptacle, centrally located in the lower portion of valve body chamber, for the purpose of engaging one of the recesses or slots on the ball with a preferable 0.003 to 0.008 inches clearance to permit free axial movement of the ball when in closed position. Also, with the ball in closed position and in cooperation with the stem, the weight of the ball is supported by said ball guide pin providing axial and concentric alignment of the sphericity of the ball with the ball/seat spacers for assurance of positive sealing of ball with the downstream ball/seat spacer during and after axial movement of the ball created by pressure inducement. Also, the ball guide pin provides means for retaining a helical coil type static electricity grounding and ball support spring.

The static electricity grounding and ball support spring is a helical coil type spring with square ends and can be manufactured from various materials such as carbon spring steel, stainless steel, inconel nickel alloy, etc., to assure proper functioning for specific service applications. The free length of the spring is important and can be established by the known pound weight of the ball versus the spring force rate in terms of pounds per inch travel, thus the distance the spring will be compressed by the ball weight is determined. This measurement is then added to the clearance dimension between the lower spherical surface of the ball and the lower spring support surface in the valve body chamber to establish the spring overall free length. In assembly, this condition will then support the ball sufficiently when in closed position and with stem positioned vertically, for assurance of axial alignment of the sphericity of the ball with the ball/seat spacers and to provide further assurance of positive sealing of ball with the downstream ball/seat spacer during and after the axial movement of the ball created by pressure inducement.

FIRE-SAFE FEATURE

In the event of excessive heat or fire destroying the ball seal rings, seats, stem thrust bearing and seal and all elastomeric seals, while the upstream piping system is pressurized and the ball in its closed position, the ball is actuated toward the downstream ball/seat spacer by differential pressure induced forces. This pressure energized ball movement develops circumferential metal sealing contact with the internal spherical concave or conical surface on the end of the ball/seat spacer and further forces the ball/seat spacer downstream to develop circumferential metal sealing contact of the opposite end of the ball/seat spacer and the precision machined radial abutment in the downstream seat recess, thus creating a sufficient sealing requirement to prevent leakage downstream of the ball valve. The aforementioned ball guide pin and static electricity grounding and ball support spring also assures the required axial and concentric alignment of the sphericity of the ball with the ball/seat spacers to achieve positive sealing of the ball with the downstream ball/seat spacer during and after pressure induced axial movement of the ball, when the ball is in closed position and the stem is positioned either vertically or horizontally. The bonnet is in precision machined metal contact with the body. Line pressure within the body cavity will force the stem upward, creating sufficient metal-to-metal sealing as the small precision machined conical surface on the stem shoulder contacts the matching precision machined conical surface of the internal shoulder of the larger stem bore in the bonnet. Responsive line pressure increases sealing capabilities at all of these sealing areas.

Other and further features and advantages of the present invention will become apparent to one skilled in the art upon consideration of this disclosure. The form of the invention, which will now be described in detail, illustrates the general principles of the invention, but it is to be understood that this detailed description is not to be taken as limiting the scope of the present invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

In the drawings:

FIG. 1 is a sectional view of an in-line repairable top entry floating ball valve constructed in accordance with the present invention and showing the spherical plug or ball thereof in its closed position.

FIG. 2 is a sectional view of the valve of FIG. 1 with the bonnet portion thereof removed and illustrating insertion movement of a ball/seat spacer by a directional arrow.

FIG. 3 is a fragmentary sectional view of the valve structure of FIGS. 1 and 2, illustrating the use of a prying tool to induce upward movement of a ball/seat spacer for extraction thereof as shown by a directional arrow.

FIG. 4 is a transverse sectional view of the valve of FIGS. 1 and 2, taken along line 4—4 of FIG. 1 and having a portion of the ball broken away for illustration of the ball/seat spacer and its semicircular recess together with other components of the valve mechanism.

FIG. 5 is also a transverse sectional view of the valve of FIGS. 1 and 2, taken along line 4—4 of FIG. 1, illustrating positioning of the valve with the operating stem thereof disposed horizontally to illustrate support of the ball by means of the operating stem and ball guide pin.

FIG. 6 is a fragmentary sectional view of the valves of FIGS. 1 and 2, illustrating a valve seat and ball/seat spacer configuration representing the preferred embodiment of this invention.

FIG. 7 is a fragmentary sectional view similar to that of FIG. 6 and illustrating a seat and ball/seat spacer representing an alternative embodiment of this invention.

FIG. 8 is a sectional view similar to that of FIGS. 6 and 7 and illustrating a seat and ball/seat spacer representing another embodiment of this invention.

FIG. 9 is also a fragmentary sectional view similar to that of FIGS. 6-8 and illustrating a seat and ball/seat spacer representing a further embodiment of this invention wherein a belleville spring urges the seat member into sealing engagement with the ball/seat spacer.

FIG. 10 is a sectional view of the valve of FIGS. 1 and 2, illustrating the condition of the internal valve components under circumstances where the seats and seals thereof have been destroyed such as by excessive heat, thus illustrating the fire-safe nature of the valve mechanism.

DESCRIPTION OF PREFERRED EMBODIMENT

Figure 1:
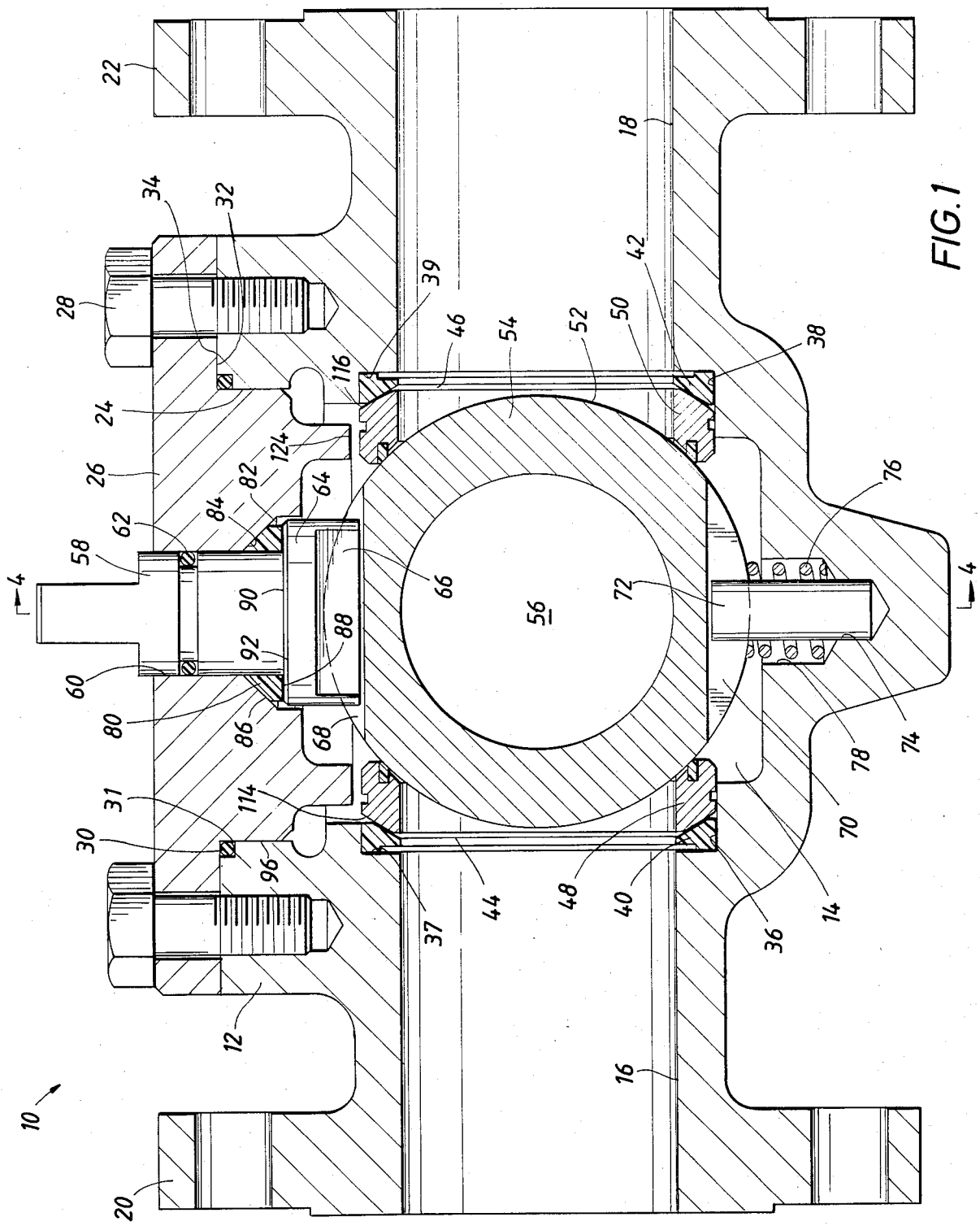

Referring now to the drawings and first to FIG. 1, an in-line repairable top entry floating ball valve construction is illustrated generally at 10 which includes a valve body 12 defining a centrally located valve chamber 14 and inlet and outlet flow passages 16 and 18. The valve body also forms connection flanges 20 and 22 permitting the valve to be assembled between the end flanges of pipe sections by means of bolts, threaded studs or the like. The valve body may also be provided with any other suitable means for connecting the valve body into a flow line. The valve body further defines an access opening 24 which is in communication with the valve chamber 14 and through which the internal movable components of the valve are inserted and extracted as will be explained hereinbelow. A bonnet member 26 is secured to the valve body by means of a plurality of bolts, cap screws 28 or the like, thereby forming a closure for the access opening. Sealing of the bonnet relative to the valve body is achieved by means of a resilient circular sealing member 30 in the form of an O-ring or any other suitable circular sealing element which is retained within a circular seal recess 31. Additionally, metal-to-metal sealing between the bonnet and valve body is achieved by precision machined surfaces 32 and 34 of the bonnet and valve body respectively which are also maintained in sealed assembly by means of the bolts or cap screws 28. In the event the circular sealing element 30 is destroyed or rendered inoperative, such as due to excessive heat during a fire, the surfaces 32 and 34 will provide the bonnet/body connection with a fire-safe sealing capability.

The valve body is further formed internally to define a pair of opposed seat recesses 36 and 38 which are located concentrically about the respective flow passages 16 and 18 at the intersection of the flow passages with the valve chamber 14. A pair of circular seat members 40 and 42 are positioned within the respective seat recesses and define respective sealing surfaces 44 and 46 which are positioned for sealing engagement with respective axial extremities of a pair of opposed ball/seat spacer members 48 and 50. The opposite axial extremities of the ball/seat spacer members are disposed in sealing engagement with the spherical sealing surface 52 of a spherical plug member or ball 54 which is positioned for rotation within the valve chamber 14 and defines a central port or passage 56 of an appropriate dimension or location for registry with the flow passages 16 and 18 of the valve body. The circular seat members 40 and 42 are composed of a resilient nonmetal sealing material as will be explained in greater detail in connection with FIG. 6, thereby causing the seat members to urge the respective ball/seat spacers into interference sealing engagement with the spherical sealing surface 52 of the ball.

It should be borne in mind that the ball member 54, when in the closed position, is so maintained within the valve chamber 14 as to have a floating capability permitting limited axial downstream movement caused by upstream pressure inducement, while being captured and aligned by its reaction with the ball/seat spacer members 48 and 50, which each encompass a substantial portion of the spherical sealing surface 52 of ball 54.

Figure 4:
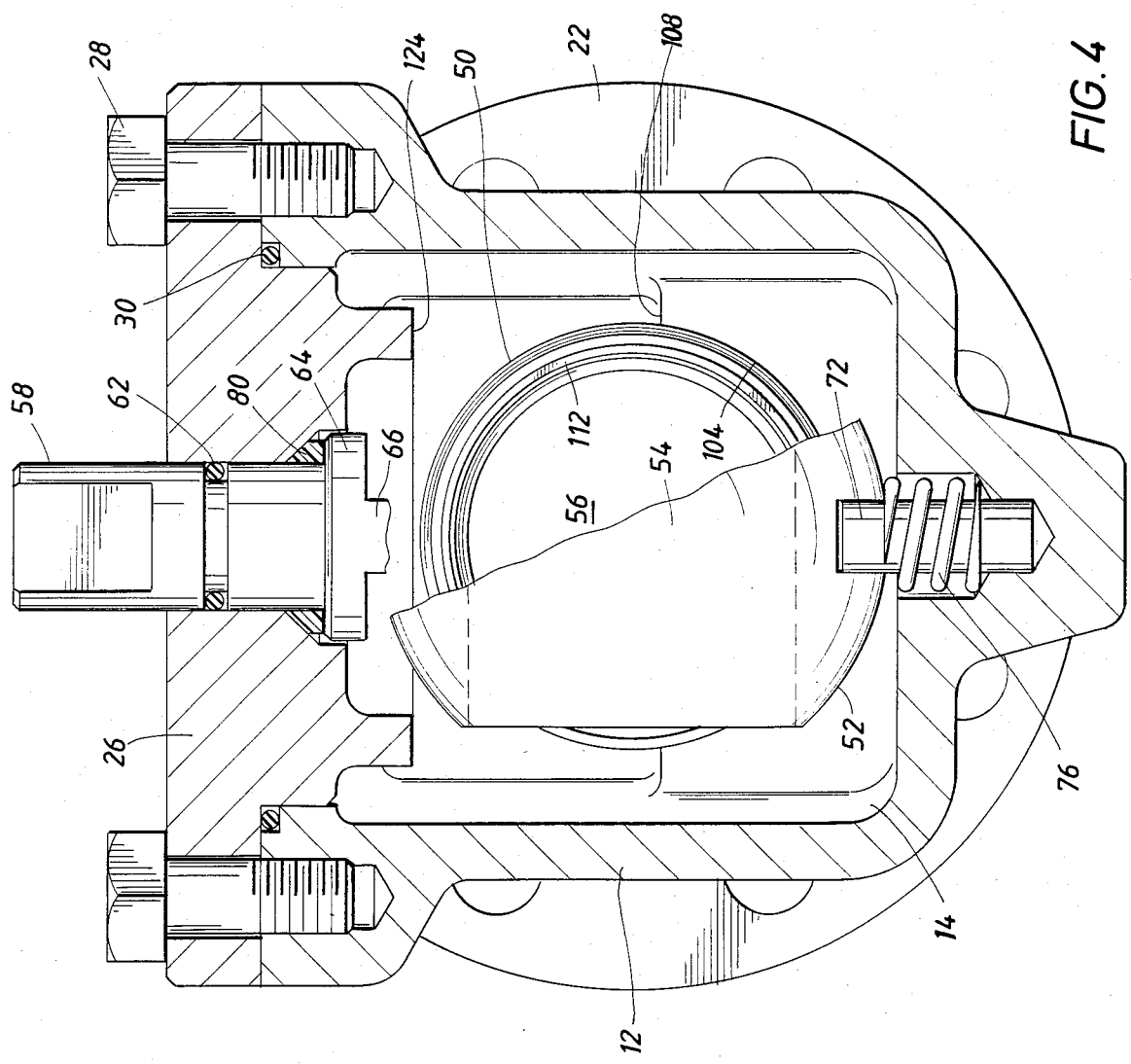
Figure 5:
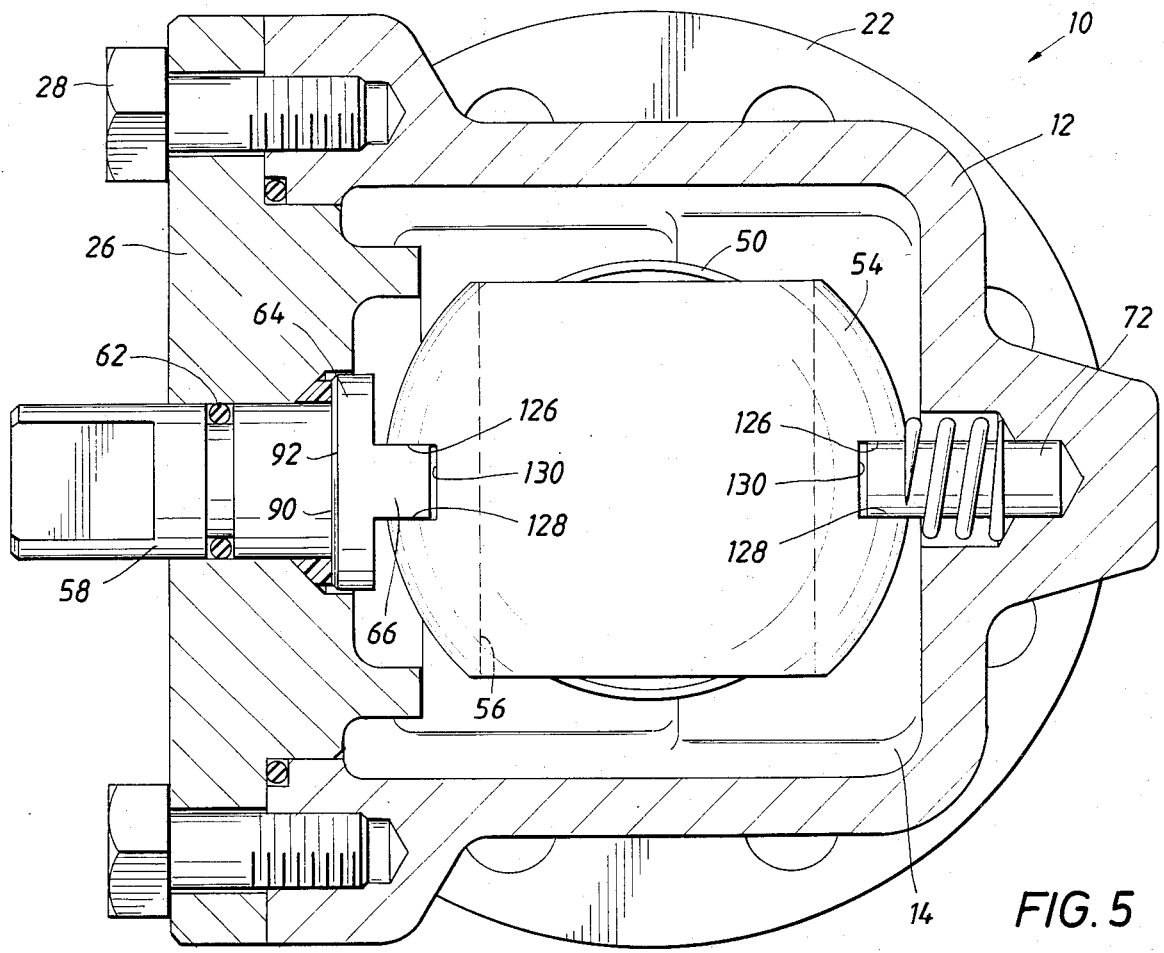
Figure 10:
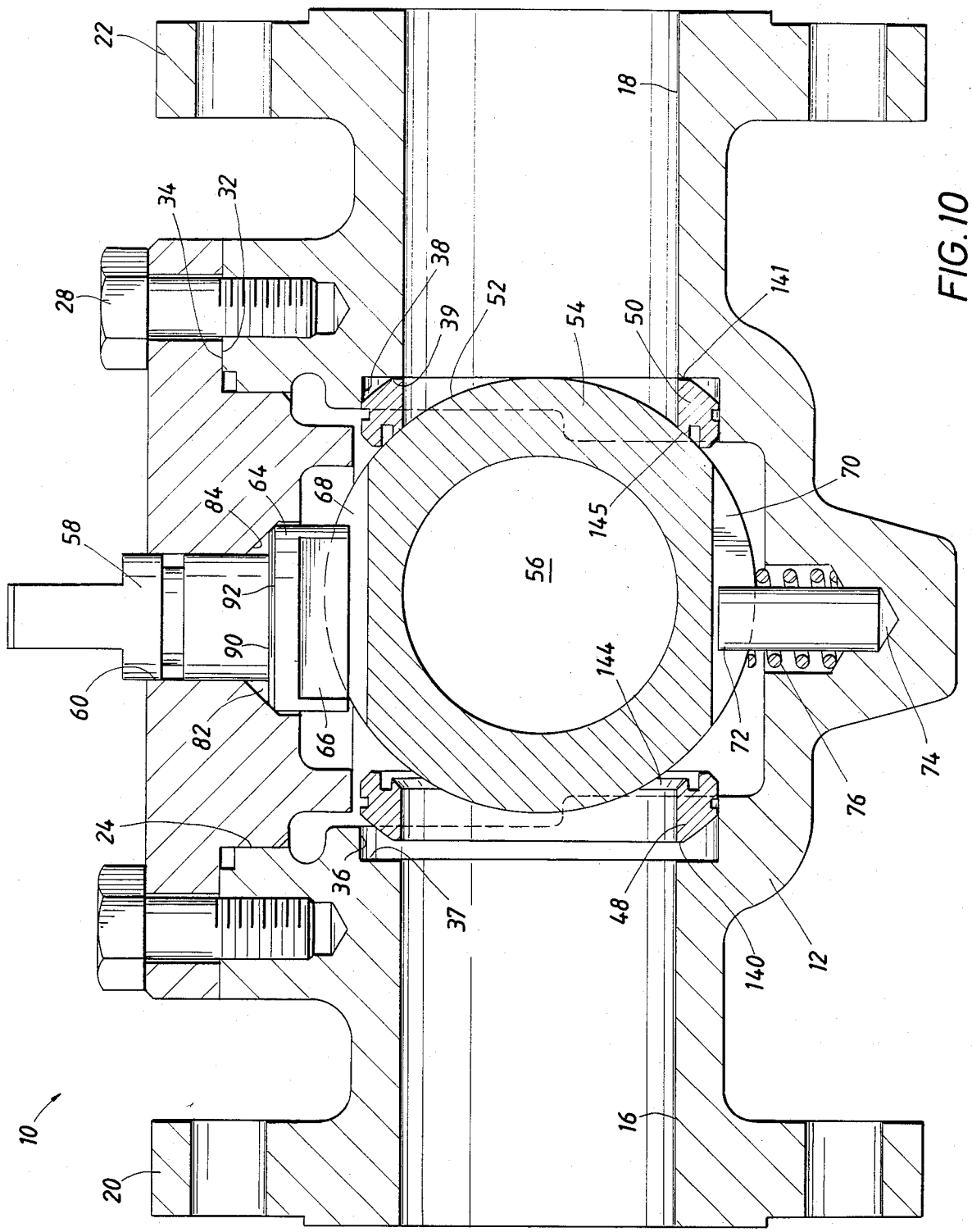

For rotation of the ball member between its open and closed position, the closed position being shown in FIGS. 1, 4 and 5, an operating stem member 58 extends through a stem passage 60 formed in the bonnet member 26 and is sealed with respect to the bonnet by means of a circular sealing member 62 such as a resilient O-ring or the like. The lower portion of the operating stem 58 defines a circular enlargement 64 having opposed portions thereof cut away so as to define an elongated drive key member 66. The drive key member is received within one of a pair of opposed, identical slots 68 and 70 formed in the valve ball. Since the slots 68 and 70 are identical, the valve ball may be positioned with either of its opposed slots facing the access opening. It is not possible therefore to misposition the ball member within the valve chamber as long as one of its slots is facing the access opening. Within the opposite slot 70 of the ball as shown in FIGS. 1, 2, 4 and 5, the inner end portion of an elongated ball guide pin 72 is received. The ball guide pin is of generally cylindrical configuration and is retained in substantially immovable relation within a pin receptacle 74 defined in the lower portion of the valve body. The guide pin 72 is of a dimension being closely received between the spaced parallel side surfaces of the ball slot 70 and provides for restraint or support of the ball only in a direction substantially aligned with the flow port 56 as is evident from FIG. 5, permitting freedom of ball movement in a direction transverse of the flow port 56. Likewise, the drive key member 66 provides for restraint or support of the ball member in a direction substantially aligned with the flow port 56 but permits freedom of ball movement in a direction transverse of the flow port 56. As shown in FIGS. 1, 5 and 10, the ball member 54 is permitted to float relative to the operating stem and ball guide pin, hence pressure induced movement of the ball member toward the downstream side of the valve chamber can occur without placing any transverse stresses on either the operating stem 58 or the ball guide pin 72. It should be borne in mind therefore that the ball guide pin 72 functions merely as a guide permitting ball movement in one direction while restraining or supporting ball movement in a direction transverse thereto.

A static electricity grounding spring 76 in the form of a helical coil spring is disposed about the guide pin 72 and is received within a spring receptacle 78 formed in the valve body. The lower portion of the spring is in contact with the valve body while the upper portion thereof is in supporting relation with the lower portion of the valve ball 54. The helical coil spring 76, in addition to providing an electrical grounding function, also provides effective support for the ball member in the position shown in FIGS. 1 and 4. Thus, the compressive character of the spring is chosen in accordance with the weight of the ball such that the ball is properly centered within the valve chamber when the spring member is compressed by the weight of the ball. No significant downward force is transmitted to the ball/seat spacer members by the weight of the free floating ball.

Primary sealing of the operating stem 58 relative to the bonnet 26 is accomplished by a circular stem thrust bearing and seal member 80 which is received within a circular packing chamber 82 having a generally conical or tapered upper surface 84. The stem thrust bearing 80 defines a correspondingly tapered upper surface 86 thereby defining a cross-sectional configuration that tapers upwardly and inwardly as shown in FIG. 1. The lower end of the thrust bearing member 80 defines a circular planar surface 88 disposed for engagement by a circular abutment surface 90 which defines a circular support shoulder for the lower extremity of the thrust bearing and seal. The circular enlargement 64 of the operating stem extends in fairly close fitting relation within the circular packing chamber and is pressure actuated in a direction toward the bonnet, thus urging the stem thrust bearing and seal toward the tapered surface 84 and causing it to be wedged into sealing engagement with the surfaces in contact therewith. This seal arrangement is such that the sealing capability of stem thrust bearing and seal is directly proportional to the pressure maintained within the valve chamber. The stem thrust bearing and seal may be composed of any one of a number of commercially available sealing materials, depending upon the character of service to be encountered. For fire-safe capability, the bearing and seal may be composed of any of a number of suitable high temperature sealing materials such as graphite, Grafoil ®, etc. To provide a metal-to-metal seal, a tapered surface 92 is formed on the circular enlargement 64 of the operating stem which corresponds to the taper of surface 84. In the event extremely high temperature is encountered and the stem thrust bearing and seal 84 is sublimated or burned away, the operating stem will be pressure energized upwardly until tapered surface 92 contacts tapered surface 84, thus providing a metal-to-metal seal to prevent or minimize leakage about the operating stem.

Figure 2:
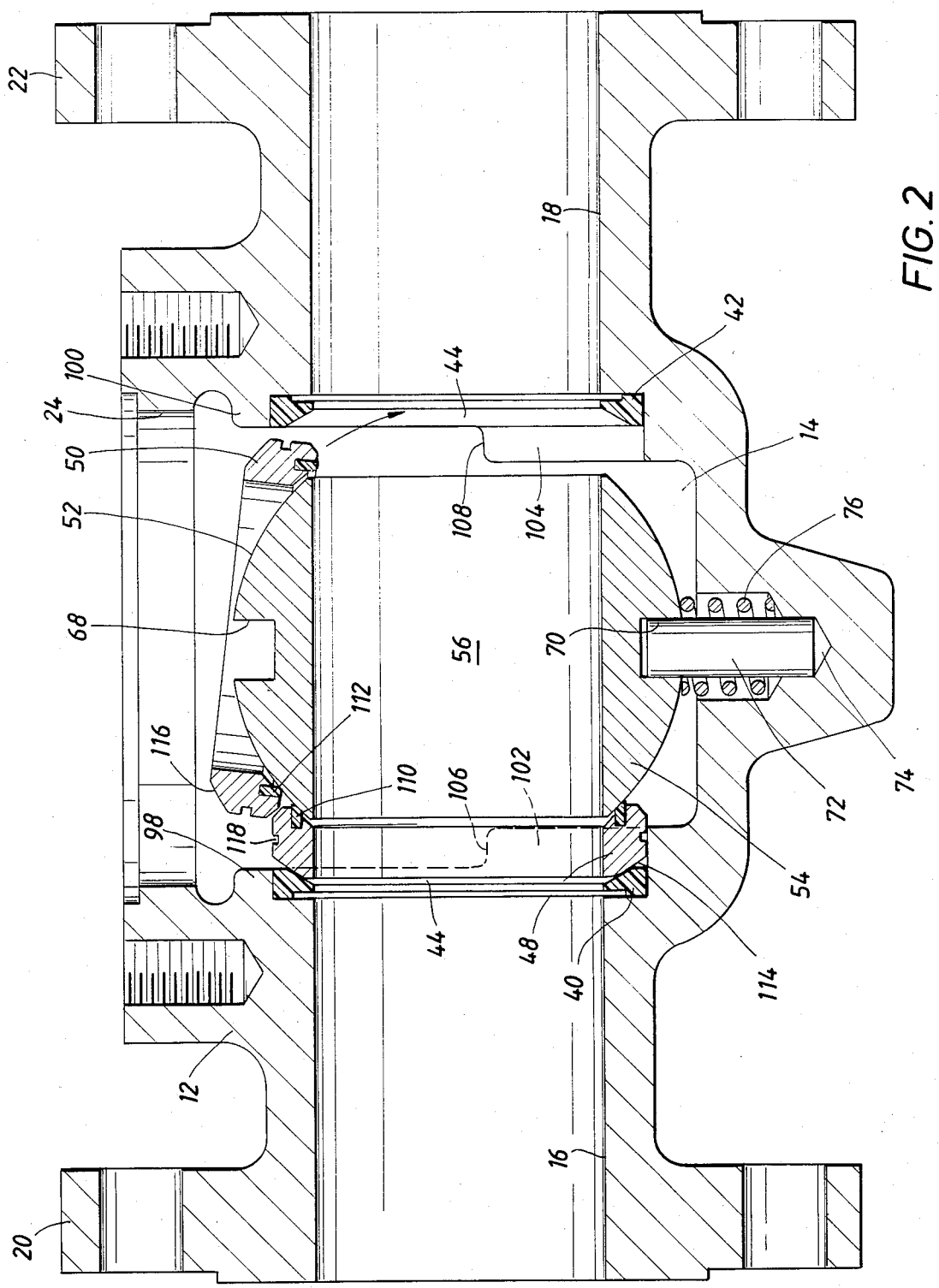

As mentioned above, the valve mechanism of this invention is designed particularly to permit in-line field repairing of valves so as to minimize down time of flow lines and thus expense of valve repair operations. Referring now to FIG. 2 of the drawings, the valve mechanism hereof is shown with the bonnet 26 removed, thereby exposing the access opening 24 to permit removal of or insertion of the internal components of the valve mechanism. For insertion or removal of the ball member 54, it should be borne in mind that the minimum dimension of the access opening is defined by a cylindrical surface 24 which is of slightly greater dimension than the spherical dimension of the ball. With the bonnet member in place, surface 24 is in close fitting relation with a corresponding cylindrical surface 96 formed on the bonnet member. The internal opposed structure 98 and 100 of the valve body, within which the seat recesses 36 and 38 are formed, may be more closely spaced than the dimension defined by the cylindrical surface 24. Since the end-to-end dimension of the ball is significantly less than the spherical dimension of the ball, the ball is thus required to be in open position orientation relative to body flow passages 16 and 18, as shown in FIG. 2, for insertion and removal. The ball is thus turned 90° from the position shown in FIG. 1 to the open position shown in FIG. 2 for insertion and removal through the access opening 24.

The internal structure of the valve body is formed to define a pair of opposed arcuate ball/seat spacer receptacles 102 and 104 which may be coincident with the respective seat recesses or of slightly larger arcuate dimension as compared to that of the seat recesses. As explained above, the upper ends of the side portions of each of the semi-circular recesses, as shown at 106 and 108, are located at a height not greater than the horizontal center line of the respective seat recesses and preferably a height slightly below said horizontal center line. With the ball member 54 in position as shown in FIG. 2, the spherical sealing surface 52 of the ball member is so spaced relative to the respective sealing surfaces 44 and 46 of the seat members 40 and 42, that a particular ball/seat clearance is defined which permits insertion of the ball/seat spacer members between the seat and ball as shown in FIGS. 1 and 2. As shown in FIG. 2, ball/seat spacer 48 is properly positioned between the seat member 40 and the ball. Seat member 50 has been inserted through the access opening 24 and has been brought into engagement with the spherical sealing surface 52 of the ball. With an arcuate movement about the spherical surface of the ball, the ball/seat spacer is moved from the position shown in FIG. 2 to the position shown in FIG. 1. During such movement of the ball/seat spacers, scoring of the spherical sealing surface 52 of the ball will not occur because contact between the ball and ball/seat spacers will be restricted to the circular ball seal member 110 or 112 disposed within appropriate seal recesses formed within each ball/seat spacer. As the ball/seat spacer is moved in the direction of the arrow shown in FIG. 2, the rear spherical shaped sealing surface 114 or 116 of the respective ball/seat spacers thereof, will engage the sealing surface of the respective seat member 40 or 42 with sufficient interference to force the lips of the seat members to yield slightly away from the ball member, causing them to be maintained under limited mechanical stress to thus provide an urging force against each of the ball/seat spacer members. This urging force develops an interference seal between each of the seat members 40 and 42 and the respective ball/seat spacers 48 and 50, and respective radial abutments 37 and 39 of seat recesses 36 and 38, such that sealing under low pressure conditions is efficiently maintained. Since the seat members are composed of a resilient sealing material such as Teflon ®, Delrin ®, etc., and the ball/seat spacers are composed of metal or other generally rigid material, it is likely that the seat members will be subject to greater wear than the ball/seat spacers. When such wear occurs, the portions of the seat members being under mechanical stress, will flex toward the ball/seat spacers and thereby maintain an effective seal. The resiliency of the seat members also compensates for pressure induced movement of the ball/seat spacers and maintains an effective seal therewith. Replacement of the seat members 40 and 42 will be necessary only after sufficient wear has occurred that effective sealing between the seats and ball/seat spacers will have been lost.

Figure 3:
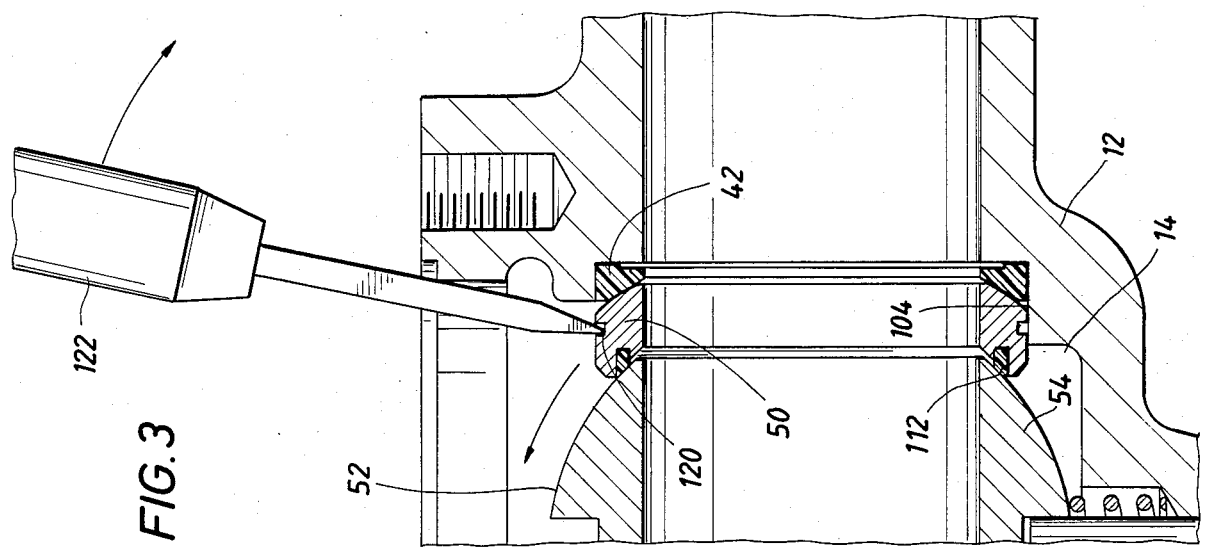

Referring now to FIG. 3, the fragmentary sectional view illustrates initial movement of ball/seat spacer 50 from its seated position between the ball 54 and seat member 42. The ball/seat spacers 48 and 50 each define external extraction grooves 118 and 120 which are visible and accessible with the bonnet removed from the valve body. A suitable implement 122 such as a screwdriver, pry bar or the like, is positioned in engagement within the extraction groove as shown in FIG. 3 and a prying force is applied to thus force the ball/seat spacer upwardly and arcuately as shown by the directional arrow. When this occurs, the ball/seat spacer moves about the spherical sealing surface 52 of the ball member from the position shown in FIG. 3 to the position shown in FIG. 2. Usually, after initial movement of the ball/seat spacer by prying activity, the ball/seat spacer becomes loose and then becomes manually movable to the position shown in FIG. 2, where it is readily removable through the access opening 24. After one of the ball/seat spacer members has been removed, the interference fit between the opposite ball/seat spacer and its seat member is typically lost and the ball/seat spacer is thus readily movable. Obviously, under certain service requirements such as for high temperature service, the ball/seat spacer members may not be provided with ball sealing members composed of resilient material, but rather may be formed with a precision machined sealing surface for metal-to-metal contact with the spherical sealing surface of the ball. In such case, this precision machined sealing surface also protects the spherical sealing surface of the ball sufficiently against scoring or other damage during insertion or extraction of the ball/seat spacers.

After the ball/seat spacers have been removed, the ball member being positioned as shown in FIG. 2, may be moved vertically and extracted through the access opening 24. After this has been done, the seat members 40 and 42 may be removed from their respective seat recesses 36 and 38 and may be replaced as desired. The ball seal members 110 and 112 integral with the ball/seat spacers, may be removed to restore them to proper sealing condition or be replaced, or if the ball/seat spacers have become corroded or worn, they may be replaced as well. After the seat members 40 and 42 and the ball member 54 have been installed into the positions as shown in FIG. 2, the ball/seat spacers are then installed in the manner described above. After this has been done, the bonnet member 26 is assembled to the body, thereby positioning a downwardly projecting retainer rim 124 of the bonnet in closely spaced relation with the upper portions of the respective ball/seat spacer members 48 and 50. Thus, with the bonnet in place, the retainer rim 124 prevents upward movement of the ball/seat spacers, while downward and lateral movement of the ball/seat spacers is effectively prevented by the arcuate receptacles 102 and 104.

As shown in FIG. 5, the valve 10 is positioned rotated 90° from the positions of FIGS. 1–4. When so positioned, the weight of the ball member 54 tends to move the ball member transversely toward one of the sides of the valve body. In such case, if such movement were permitted, the force of the valve ball weight would be applied transversely to the sealing portions of the ball/seat spacer members. In such position, however, the ball member is effectively supported by the operating stem 58 and the ball guide pin 72. The opposed slots 68 and 70 of the ball are each formed by a pair of parallel side surfaces 126 and 128, and elongated bottom surfaces 130, disposed in substantially normal relation thereto. In the position shown in FIG. 5, the ball 54 is effectively supported by the drive key portion 66 of the operating stem and by the inwardly extending portion of the guide pin 72. For example, as shown in FIG. 5, the ball is supported by engagement of side surfaces 126 of the slots in engagement with the drive key 66 and the guide pin 72. If the ball member is rotated 180°, the opposite side surfaces 128 of the slots will be in supporting engagement with the drive key and guide pin. In either case, the ball member remains free to float upstream or downstream responsive to pressure changes within the valve without inducing any transverse stress to the operating stem or guide pin. The only transverse forces to which these components are subject to in the position shown in FIG. 5, is the weight of the valve ball.

Figure 6:
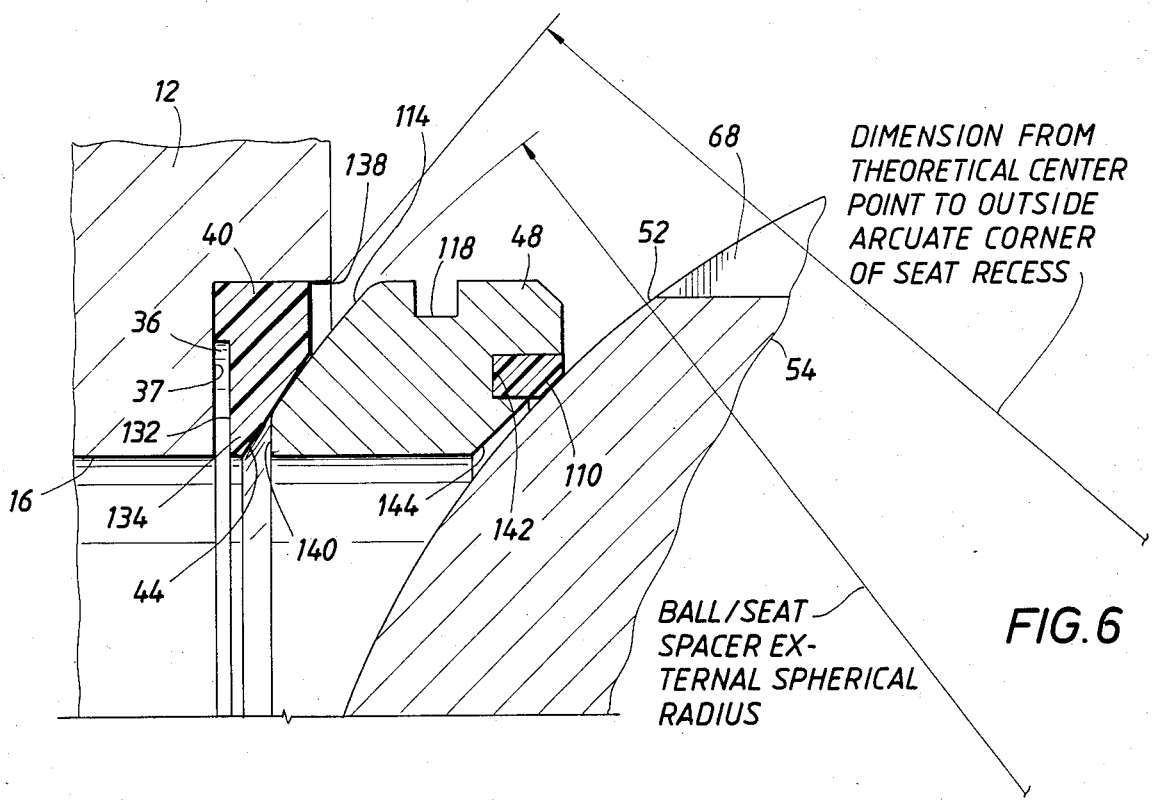

An enlarged view of the preferred embodiment of this invention is illustrated by the fragmentary sectional view of FIG. 6. In this embodiment, the seat member 40 is shown to define a rear recess surface 132 which is spaced from the precision machined seat recess abutment surface 37 and defines a relief relative to the seat recess abutment surface 37 such that the seat is enabled to yield away from the ball by the interference fit thereof with the ball/seat spacer. As shown, the seat member 40 defines a sealing surface 44 which is of conical configuration and which is tapered toward the relief surface portion 132 of the seat so as to define an inwardly extending tapered lip 134. Since the seat member is composed of a resilient sealing material as explained above, the inwardly extending lip is flexible, being more yieldable toward the radially inner portion thereof due to the reduced cross-sectional dimension of the sealing material. The ball/seat spacer member 48 is formed with a generally spherical sealing surface 114 which has sealing engagement with the conical surface 44 of the seat toward the radially inner extremity of the seat. The spherical sealing surface 114 defines a clearance with the circular edge 138 of the inner body structure, the clearance being defined by the respective dimensions of the external spherical radius of the ball/seat spacer and the distance of the circular edge 138 from the theoretical center point of the valve chamber as shown graphically in the figure. This clearance is necessary to permit proper insertion and extraction of the ball/seat spacer members 48 and 50 with the valve ball 54 in place within the valve chamber.

As shown, the ball/seat spacer defines an end surface 140 which is precision machined and which is adapted to establish metal-to-metal sealing with the planar abutment surface 37 of the seat recess under circumstances where the seat member 40 may have been sublimated or burned away by excessive heat. At the opposite axial extremity of the ball/seat spacer, the circular ball seal member 110 is located within an appropriate seal recess 142 and projects axially beyond a conical or spherical concave end surface 144 for sealing engagement with the spherical sealing surface 52 of the ball. The conical or spherical concave surface 144 is also precision machined and is capable of establishing a metal-to-metal sealing relationship with the spherical sealing surface 52 under circumstances where the circular ball seal member 110 may have been burned away or sublimated by excessive heat.

Figure 7:
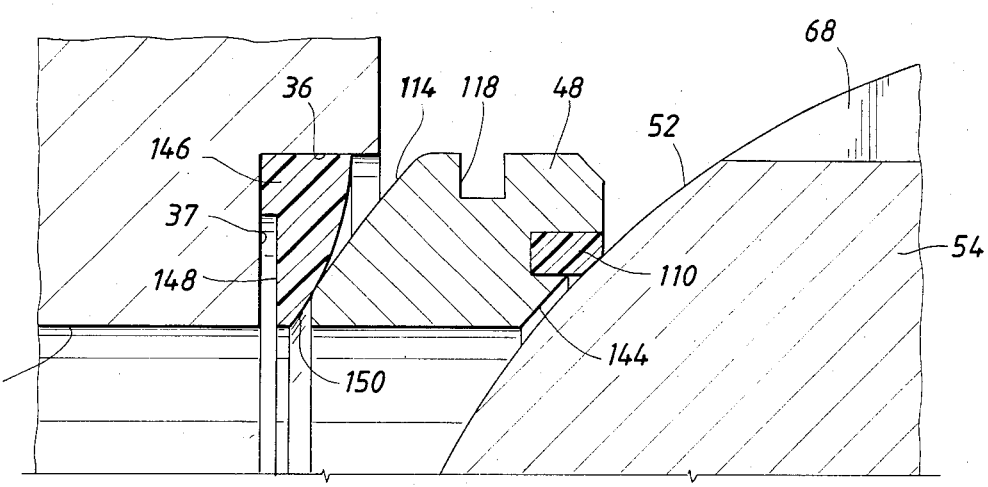

In FIG. 7, an alternative embodiment of the present invention is disclosed wherein like parts are referred to by like reference numerals. In this embodiment, the ball/seat spacer member 48 may be substantially identical with that shown in FIG. 6. In the embodiment of FIG. 7, a circular seat member 146 is provided which forms a relief surface 148 similar to that shown at 132 in FIG. 6. The seat member 146 however defines a convex arcuate sealing surface 150 for sealing engagement with the spherical sealing surface 114 of the ball/seat spacer 48.

Figure 8:
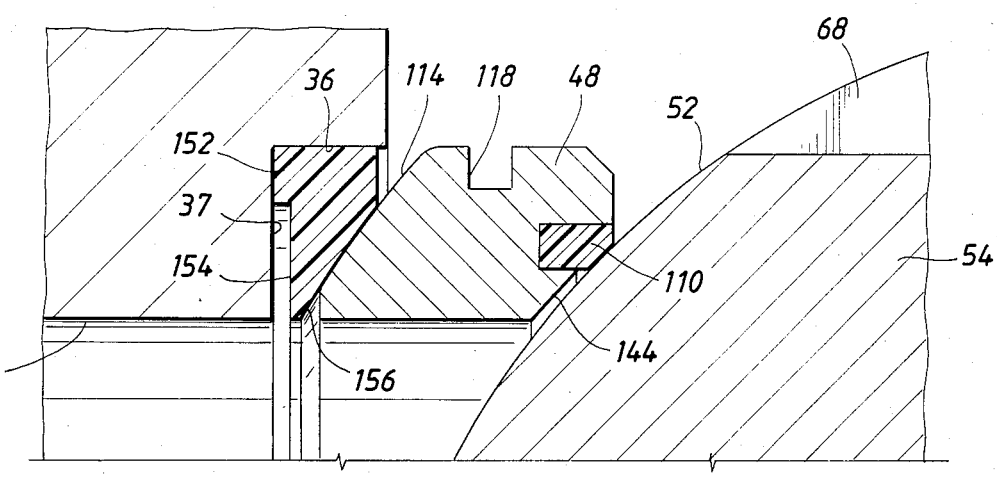

Another embodiment of this invention is illustrated in the fragmentary sectional view of FIG. 8, wherein like parts are also illustrated by like reference numerals. In this case, the ball/seat spacer member 48 may be substantially identical with that shown in FIGS. 6 and 7. A circular seat member 152 is positioned within the seat recess 36 and defines a relief surface 154 similar to that shown in FIGS. 6 and 7. The seat member 152 defines a concave arcuate sealing surface 156 for sealing engagement with the spherical sealing surface 114 of the ball/seat spacer 48.

Figure 9:
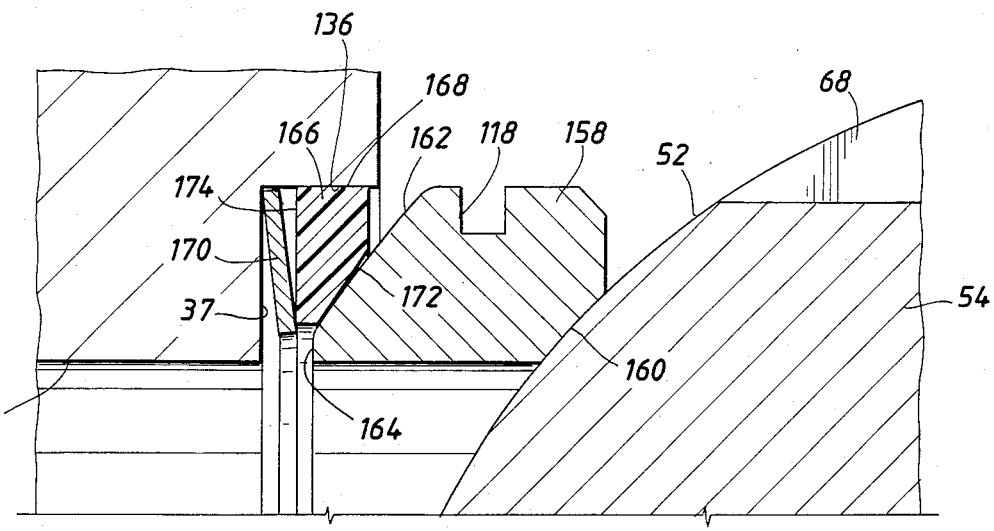

In FIG. 9, a further alternative embodiment of this invention is illustrated wherein the valve mechanism is adapted for high temperature service or other service conditions wherein a metal-to-metal seal is required between the valve ball and ball/seat spacer. In FIG. 9, like parts are also referred to by like reference numerals. A ball/seat spacer 158 is precision machined to define a concave spherical surface 160 which establishes metal-to-metal sealing engagement with the spherical sealing surface 52 of the valve ball 54. At its opposite axial extremity, the ball/seat spacer member defines a spherical sealing surface 162 and an end sealing surface 164. A seat member 166 is located within the seat recess 36 with only the outer peripheral surface 168 thereof in engagement with the radially outer seat recess surface. The seat member 166 may be composed of any one of a number of high temperature sealing materials such as Grafoil ®, graphite, etc. A belleville spring 170 is also positioned within the seat recess 36 with a radially inner portion thereof in contact with the circular seat member 166, thus urging the radially inner portion of the seat member 166 into interference sealing relation with the spherical sealing surface 162 of the ball/seat spacer. The seat member 166 also defines a conical sealing surface 174 which cooperates with the rear planar surface portion 174 thereof to define a cross-sectional configuration of the seal which decreases toward the radially inner portion thereof. The taper of conical surface 172 is so related to the spherical sealing surface 162 that sealing contact between the seat member 166 and surface 162 occurs at the radially inner portions thereof. The belleville spring 170 thereby forces the inner portion of the seat into interference sealing engagement or preload with the ball/seat spacer.

FIRE-SAFE FEATURE

Referring now to FIG. 10, in the event of excessive heat or fire destroying the ball seals 110 and 112, seats 40 and 42, stem thrust bearing and seal 80, upper stem elastomeric seal 62 and bonnet seal 30, while the piping system is pressurized and the floating ball 54 is in closed position, the floating ball 54 is actuated downstream by pressure inducement, developing circumferential metal sealing contact of the spherical sealing surface 52 of the floating ball with the precision machined internal conical or spherical concave surface 145 of ball/seat spacer 50 and further, ball/seat spacer 50 is actuated downstream to develop circumferential metal sealing contact of the precision machined surface 141 on end of ball/seat spacer with the adjacent precision machined radial abutment surface 39 of seat recess 38 formed in valve body 12. The bonnet 26 is in precision metal sealing contact with valve body 12 by virtue of the precision machined respective sealing surfaces 32 and 34. Line pressure within the valve body chamber 14 will piston effectively force the stem 58 upwardly creating efficient metal-to-metal circumferential sealing by the small precision machined conical surface 92, formed on the circular enlargement 64 of the stem, with the precision machined conical surface 84 which forms the upper shoulder of the larger stem bore 82 in bonnet 26. Responsive line pressure increases sealing capabilities at all of these sealing areas.

ASSEMBLY PROCEDURE

The following assembly procedure for this invention may be followed for proper initial assembly of the valve mechanism or as required for maintenance while valve body remains in the piping system. This procedure, however, may be varied slightly to suit the needs of personnel performing the assembly.

The ball guide pin 72 in inserted properly in the receptacle 74 centrally located in the lower portion of valve body chamber 14 with the static electricity grounding and ball support spring 76 positioned about said ball guide pin 72. The seat rings 40 and 42 are then properly installed into seat ring recesses 36 and 38 respectively as illustrated in FIGS. 1 and 2. Note that for high temperature service applications, a seat ring 166 of Grafoil ® or soft graphite along with a belleville type spring 170 may be utilized as illustrated by FIG. 9. The floating ball 54 is inserted through access opening 24 of the valve body in open position orientation relative to body flow passages 16 and 18 and further engaging the lower recess or slot 70, formed on floating ball 54, with ball guide pin 72 and being supported by static electricity grounding and ball support spring 76. With floating ball 54 in either open or closed position, but preferably in the open position, the ball/seat spacer 48 with ball seal ring 110 pre-assembled into seal recess 142 formed on internal face 144 of ball/seat spacer, is inserted through access opening 24 of the valve body until the ball seal ring 110 engages the upper spherical sealing surface 52 of floating ball 54, being generally axially aligned with said access opening 24, and further caused to slide in a downward movement about the spherical sealing surface 52 of floating ball 54 in a direction toward semicircular recess 102 formed in valve body chamber 14, as illustrated by arrow in FIG. 2, until the ball/seat spacer 48 is positioned into the semi-circular recess 102 in such a manner to become engaged with and axially aligned with seat ring 40 and body flow passage 16 as illustrated in FIG. 2. The second ball/seat spacer 50 including its ball seal ring 112 is similarly installed into semi-circular recess 104, as illustrated in FIGS. 1 and 2. Note that for high temperature service applications, the ball seal ring may be omitted from the internal face of the ball/seat spacers. With the required upper stem seal 62 in position and the conical shaped stem thrust bearing and seal 80 installed in engagement contact with shoulder 90 of stem member 58, the tongue or key 66 defining the lower end of the stem 58 is inserted into the upper recess or slot 68 formed on the floating ball. The stem 58 may be lubricated as desired at the area of engagement with the reduced stem bore 60 in bonnet 26. A bonnet seal 30 is positioned in the circular seal recess 31 formed about the cylindrical upper periphery of access opening 24 in the top of valve body 12. The assembly procedure is completed by positioning of bonnet 26 over stem 58 in proper orientation with the valve body 12 and securely attaching the bonnet 26 to the upper portion of the valve body 12 by means of proper bolts or cap screws 28. If external stem packing is utilized for specific designs requiring same, it is retained and adjusted as required. Afterwards, any suitable valve actuating means may be brought into assembly with the stem 58 and bonnet 26 for manual or powered actuation of valve assembly as required.

DISASSEMBLY PROCEDURE

The following disassembly procedure may be followed for disassembly of the valve mechanism of this invention while the valve is installed in the piping system for simple maintenance and repairing as required from time to time.

With the piping system bled down to atmospheric pressure both upstream and downstream of the valve location and the floating ball 54 in either open or closed position, the actuator means may be removed from attachment to stem 58 and bonnet 26 as required or desired and further removal of all bolts or cap screws 28 will permit removal of the bonnet 26 and stem 58 subassembly, providing an access opening 24 in the top of valve body 12 for removal of all internal valve components. Stem 58 may be removed from stem bore 60 in bonnet 26 for further disassembly of upper stem seal 62 and stem thrust bearing and seal 80. A screw driver or any similar suitable prying tool is engaged in the circumferential groove 118 or 120 on the periphery of ball/seat spacer 48 or 50 and with leverage applied to said screw driver or prying tool as illustrated in FIG. 3, the ball/seat spacer will slide in an upward movement out of the semi-circular recess and about the spherical sealing surface 52 of floating ball 54 as illustrated by arrow in FIG. 3, and continue in such movement until the ball/seat spacer becomes disengaged from the corresponding seat ring, permitting easy removal of said ball/seat spacer through access opening 24 in top of valve body 12. The second ball/seat spacer will then be free for easy removal of same liekwise, possibly without any prying requirement. In open position, the floating ball 54 can then be simply removed through said access opening 24. Afterwards, the seat rings 40 and 42 are easily retracted from their respective recesses 36 and 38 for removal through said access opening 24. The static electricity grounding and ball support spring 76 is easily removed from about the ball guide pin 72.

In view of the foregoing, it is apparent that the present invention is clearly adapted to accomplish all of the features hereinabove set forth, together with other features which will become obvious and inherent from a description of the apparatus itself. It will be understood that certain combinations and sub-combinations are of utility and may be employed without reference to other features and sub-combinations. This is contemplated by and is within the scope of the present invention.

While the foregoing is directed to the preferred embodiments of the present invention, other and further embodiments of the invention may be devised without departing from the basic scope thereof, and the scope thereof is determined by the claims which follow.

What is claimed is:
1. An in-line repairable top entry ball valve, comprising:
  (a) a body forming a valve chamber and flow passage means intersecting said valve chamber, said body further forming an access opening in communication with said valve chamber, seat recess means concentrically about said flow passage and arcuate ball/seat spacer receptacle means substantially concentric with said seat recess means;
  (b) a ported spherical plug member being positioned for rotation within said valve chamber between open and closed positions relative to said flow passage, said spherical plug member being of a dimension for passage through said access opening;

(c) resilient seat means being disposed within said seat recess means and being positioned in spaced relation with said spherical plug member and defining sealing surface means disposed in concentric relation with said spherical plug member, said resilient seat means being in the form of at least one annular seat member composed of resilient material;

(d) ball/seat spacer means being disposed in sealing engagement with said spherical plug member and said resilient seat means, said sealing engagement being interference sealing engagement induced thereto by said resilient seat means, said ball/seat spacer means being of a dimension for passage through said access opening and being insertable into and removable from said arcuate ball/seat spacer receptacle means with said spherical plug member present within said valve chamber and said resilient seat means present within said seat recess;

(e) bonnet means forming a sealed closure for said access opening and defining a retainer projection disposed to secure said ball/seat spacer means against inadvertent displacement; and (f) an operating stem extending through said bonnet means and having driving interconnection with said spherical plug member for rotation thereof between open and closed positions relative to said flow passage.

2. An in-line repairable top entry ball valve as recited in claim 1, wherein:
said ball/seat spacer means is defined by a generally rigid ring having a first sealing surface for sealing engagement with said spherical plug member and a second sealing surface for sealing engagement with said resilient seat means, during insertion and removal of said ball/seat spacer means said generally rigid ring being moved arcuately about the spherical outer surface of said spherical plug member.

3. An in-line repairable top entry ball valve as recited in claim 2, wherein:
said second sealing surface is disposed in spherically concentric relation with said spherical plug member when said first sealing surface is in sealing engagement with said spherical plug member.

4. An in-line repairable top entry ball valve as recited in claim 2, wherein:
said second sealing surface is disposed in spherically concentric relation with said sealing surface of said resilient seat means during arcuate movement of ball/seat spacer about the spherical surface of said spherical plug member.

5. An in-line repairable top entry ball valve as recited in claim 2, wherein:
said ball/seat spacer means defines an external groove that is visible and accessible through said access opening when said bonnet member is separated from said body, said external groove receiving a prying tool to permit prying induced movement of said ball/seat spacer means about the spherical surface of said spherical plug member during extraction thereof from said ball/seat spacer receptacle.

6. An in-line repairable top entry ball valve as recited in claim 1, wherein:

said annular resilient seat member defines a cross-sectional configuration forming a ball/seat spacer sealing surface and a radially inwardly extending flexible sealing lip that is yieldable by said ball/seat spacer means and thus maintains said interference sealing engagement with said ball/seat spacer means.

7. An in-line repairable top entry ball valve as recited in claim 6, wherein:
said ball/seat spacer sealing surface of said annular seat member is of conical configuration.

8. An in-line repairable top entry ball valve as recited in claim 6, wherein:
said ball/seat spacer sealing surface of said annular seat member is of generally spherical concave configuration.

9. An in-line repairable top entry ball valve as recited in claim 6, wherein:
said ball/seat spacer sealing surface of said annular seat member is of convex configuration.

10. An in-line repairable top entry ball valve as recited in claim 1, wherein:
spring means is interposed between said body and said annular resilient seat member and urges said annular resilient seat member into sealing engagement with said ball/seat spacer means.

11. An in-line repairable top entry ball valve as recited in claim 2, wherein:
said ball/seat spacer means forms metal-to-metal sealing with said spherical plug member.

12. An in-line repairable top entry ball valve as recited in claim 1, wherein:
said annular resilient seat member is composed of heat resistant material.

13. An in-line repairable top entry ball valve as recited in claim 1, wherein:
(a) said ported spherical plug member defines opposed slots;
(b) said operating stem defines a non-circular drive key member received within one of said opposed slots; and
(c) a guide pin is received within said body and extends into said valve chamber and further extends into the other of said opposed slots, said spherical plug member being movable relative to said operating stem and said guide pin in the direction of said opposed slots and being supported by said operating stem and said guide pin in a direction transversely of said opposed slots.

14. An in-line repairable top entry ball valve as recited in claim 13, including:
a helical coil spring member disposed about said guide pin and being operative to provide support for said spherical plug member, said helical coil spring member also providing electrical grounding of said spherical plug member to said body.

15. An in-line repairable top entry ball valve as recited in claim 13, wherein:
said opposed slots in said spherical plug member are substantially indentical, permitting positioning of said spherical plug member with either of said opposed slots directed toward said access opening.

16. An in-line repairable top entry ball valve as recited in claim 1, wherein:
(a) said bonnet forms a packing chamber about said operating stem, said packing chamber having a circular tapered upper surface converging toward said operating stem;

(b) a circular thrust bearing and stem seal member is located within said packing chamber and forms a tapered extremity corresponding to said circular tapered upper surface and an opposite extremity directed toward said valve chamber; and (c) said operating stem defines an annular shoulder supporting said opposite extremity of said circular thrust bearing and stem seal member.

17. An in-line repairable top entry ball valve as recited in claim 16, wherein:

said packing chamber and said annular shoulder of said operating stem are of such dimension that said annular shoulder is received in close fitting relation within said packing chamber.

18. An in-line repairable top entry ball valve as recited in claim 16, wherein:

said circular thrust bearing and stem seal member is composed of a heat resistant sealing material.

19. An in-line repairable top entry ball valve as recited in claim 17, wherein:

said annular shoulder of said operating stem forms a circular tapered surface corresponding to the taper of said circular tapered upper surface of said packing chamber, in the event said circular thrust bearing and stem seal member is burned away, said circular tapered surface of said annular shoulder is pressure actuatable into metal-to-metal sealing engagement with said circular tapered upper surface of said packing chamber.

20. An in-line repairable ball top entry valve as recited in claim 2, wherein:

said ball/seat spacer means defines opposed metal sealing surfaces, in the event said resilient seat means is burned away by excessive heat, said ball/seat spacer means on the downstream side of said spherical plug member establishes fire-safe metal-to-metal sealing with said spherical plug member and said body, responsive to pressure induced downstream movement of said spherical plug member and ball/seat spacer means.

21. An in-line repairable top entry ball valve as recited in claim 1, wherein:

(a) said body forms intersecting cylindrical and planar surfaces defining a circular bonnet seal recess about said access opening for receiving a bonnet seal therein;

(b) said bonnet seal is composed of resilient material; and (c) said bonnet means defines intersecting cylindrical and planar surfaces forming closure surfaces for said bonnet seal recess for retainment of said bonnet seal.

22. An in-line repairable top entry ball valve as recited in claim 21, wherein:

said body and said bonnet means define corresponding precision machined metal-to-metal sealing surface providing fire-safe sealing in event said bonnet seal should be destroyed by excessive heat.

23. An in-line repairable top entry ball valve, comprising:

(a) a body forming a valve chamber and flow passage means intersecting said valve chamber, said body further forming an access opening in communication with said valve chamber, seat recess means concentrically about said flow passage and arcuate ball/seat spacer receptacle means substantially concentric with said seat recess means;

(b) a ported spherical plug member being positioned for rotation within said valve chamber between open and closed positions relative to said flow passage, said spherical plug member and said access opening being of a dimension for close fitting passage of said spherical plug member through said access opening, said spherical plug member also having an end-to-end dimension less than the diameter of the spherical surface thereof;

(c) resilient seat means being disposed within said seat recess means and being positioned in spaced relation with said spherical plug member, said resilient seat means defining circular sealing surface means disposed in concentric relation with said spherical plug member;

(d) ball/seat spacer means being positioned in sealing engagement with said spherical plug member and said circular sealing surface of said resilient seat means, said ball/seat spacer means being of a dimension for passage through said access opening and being insertable into and removable from said arcuate ball/seat spacer receptacle means with said spherical plug member present within said valve chamber and said resilient seat means present within said seat recess, said ball/seat spacer means, upon being positioned between said resilient seat means and said spherical plug member, induces interference yielding of said circular sealing surface means of said resilient seat means;

(e) bonnet means forming a sealed closure for said access opening and defining a retainer projection disposed to secure said ball/seat spacer means against inadvertent displacement; and (f) an operating stem extending through said bonnet means and having driving interconnection with said spherical plug member for inducing opening and closing rotational movement thereof relative to said flow passage means.

24. An in-line repairable top entry ball valve as recited in claim 23, wherein:

said ball/seat spacer means defines first sealing surface means with resilient circular seal means being incorporated therewith in sealing engagement with said spherical plug member and second sealing surface means in sealing engagement with said circular sealing surface means of said resilient seat means, said second sealing surface means being in a spherical segment form and being in concentric relation with said spherical plug member.

25. An in-line repairable top entry ball valve as recited in claim 23, wherein:

said ball/seat spacer means defines precision machined axial extremities, in the event said resilient circular seal means and said resilient seat means are destroyed by excessive heat, said axial extremities establish metal-to-metal sealing engagement with said body and said spherical plug member responsive to pressure actuation of said spherical plug member in its closed position toward the downstream direction thereof.

26. An in-line repairable top entry ball valve as recited in claim 23, wherein:

(a) said bonnet forms a packing chamber about said operating stem, said packing chamber having a circular tapered upper surface converging toward said operating stem;

(b) a circular thrust bearing and stem seal member being located within said packing chamber and forming a tapered extremity corresponding to said circular tapered upper surface and an opposite extremity directed toward said valve chamber; and (c) said operating stem defining an annular shoulder supporting said opposite extremity of said circular thrust bearing and stem seal member.

27. An in-line repairable top entry ball valve as recited in claim 26, wherein:

said bonnet means and said operating stem define corresponding tapered surfaces providing metal-to-metal sealing created by pressure responsive movement of said operating stem in the event said circular thrust bearing and stem seal is destroyed by excessive heat.

28. An in-line repairable top entry ball valve as recited in claim 23, wherein:

(a) said ported spherical plug member defines opposed slots;

(b) said operating stem defines a non-circular drive key member received within one of said opposed slots; and (c) a guide pin being received within said body and extending into said valve chamber and further extending into the other of said opposed slots, said spherical plug member being movable relative to said operating stem and said guide pin in the direction of said opposed slots and being supported by said operating stem and said guide pin in a direction transversely of said opposed slots.

29. An in-line repairable top entry ball valve as recited in claim 23, wherein:

said bonnet means and said body define corresponding precision machined sealing surfaces in metal-to-metal sealing engagement and providing fire-safe bonnet to body sealing in the event of destruction of said bonnet seal from excessive heat.

30. An in-line repairable top entry ball valve, comprising:

(a) a body forming a valve chamber and inlet and outlet flow passages intersecting said valve chamber, said body further forming an access opening in communication with said valve chamber, a pair of spaced circular seat recesses being formed concentrically about said flow passages and a pair of arcuate ball/seat spacer ring receptacle means being formed substantially concentric with each of said circular seat recesses;

(b) a ported spherical closure member being positioned for rotation within said valve chamber between open and closed positions relative to said flow passages, said spherical closure member forming a spherical external sealing surface and being of a dimension permitting passage thereof through said access opening into and from said valve chamber;

(c) a pair of circular seat elements composed of resilient material and being disposed within respective ones of said circular seat recesses in spaced relation with said spherical closure member and defining sealing surface means disposed in concentric relation with said spherical closure member;

(d) a pair of ball/seat spacer rings being positioned with a first axial extremity thereof in sealing engagement with said spherical closure member and a second axial extremity thereof in sealing engagement with respective ones of said circular seat elements, said ball/seat spacer rings being of a dimension for passage through said access opening and being insertable into and removable from said arcuate ball/seat spacer ring receptacles with said spherical closure member present within said valve chamber and said circular seat elements present within their respective ones of said circular seat recesses, said second axial extremity of each said ball/seat spacer rings being in the form of a segment of a sphere and being oriented in spherically concentric relation with said spherical closure member to permit unobstructed arcuate movement of said ball/seat spacer rings about the spherical sealing surface of said spherical closure member during insertion into and removal from said arcuate ball/seat spacer ring receptacles;

(e) bonnet means forming a sealed closure for said access opening and defining a retainer projection positioned to secure said ball/seat spacer rings against inadvertent displacement from said arcuate ball/seat spacer ring receptacles toward said bonnet means;

(f) an operating stem extending in sealed relation through said bonnet means and having driving interconnection with said spherical closure member for imparting rotary opening and closing movement to said spherical closure member relative to said flow passages; and (g) corresponding metal sealing surface means being formed by said body, said ball/seat spacer rings, said bonnet means, said spherical closure member and said operating stem which establish metal-to-metal sealing in the event said circular seat elements and seals of said ball valve should be destroyed by excessive heat.

31. An in-line repairable top entry ball valve as recited in claim 30, wherein:

(a) said spherical closure member defines a pair of generally parallel opposed slots;

(b) said operating stem having a drive key of non-circular cross-sectional configuration received in driving relation within one of said parallel opposed slots; and (c) a guide pin of circular cross-sectional configuration being receivable in guiding relation within the other of said parallel opposed slots, said drive key and said guide pin permitting guided downstream axial movement of said spherical closure member in the closed position thereof while simultaneously restraining movement of said spherical closure member in a direction transversely of said parallel opposed slots.

32. An in-line repairable top entry ball valve as recited in claim 31, wherein:

a helical coil static electricity grounding and spherical closure support spring is positioned about said guide pin with ends thereof in force transmitting engagement with said spherical closure member and said body.

33. An in-line repairable top entry ball valve as recited in claim 30, wherein:

said circular seat recesses and said arcuate ball/seat spacer ring receptacle means are oriented in concentric relation and said arcuate ball/seat spacer ring receptacle means define openings directed toward said bonnet means, said openings being positioned at a height not greater than the horizontal center line of said circular seat recesses.

34. An in-line repairable top entry ball valve as recited in claim 30, wherein:

said ball/seat spacer rings are composed of generally rigid material and form a metal sealing surface at one axial extremity thereof for sealing engagement with said circular sealing lips of said circular seat elements, said ball/seat spacer rings each having circular resilient seal means at the other axial extremity thereof for sealing engagement with said spherical closure member.

35. An in-line repairable top entry ball valve as recited in claim 34, wherein:
   (a) said ball/seat spacer rings each form metal sealing surface means at said one axial extremity for metal-to-metal sealing with said body in the event of destruction of said circular seat elements by excessive heat; and
   (b) said ball/seat spacer rings each form a metal sealing surface at said other axial extremity disposed for metal-to-metal sealing with said spherical closure member in the event of destruction of said circular seal means by excessive heat.

36. A ball/seat spacer for an in-line repairable top entry ball valve, comprising:
   a generally rigid integral spacer ring having a first sealing surface formed on one axial end of said rigid ring and a second sealing surface formed on the opposing axial end of said rigid integral spacer ring, said first sealing surface being formed internally of said rigid ring, said second sealing surface being formed externally of said rigid integral spacer ring, said second sealing surface being spherically concentric with said first sealing surface, permitting unobstructed arcuate movement of said ball/seat spacer about the spherical surface of a spherical plug member of said in-line repairable top entry ball valve to position said second sealing surface in sealing engagement with annular resilient seat means of said in-line repairable top entry ball valve, said first sealing surface providing for circumferential sealing engagement with said spherical plug member of said in-line repairable top entry ball valve and said second sealing surface providing for simultaneous circumferential sealing engagement with said annular resilient seat means of said in-line repairable top entry ball valve thus constituting an integral sealing spacer between the spherical plug member and the annular resilient seat means, the axial length of said ball/seat spacer being determined by a distance greater than the space measurement from the circumferential tangent sealing point on the spherical surface of said spherical plug member to the circumferential tangent sealing point on the sealing surface of said annular resilient seat means to provide for sealing with said annular resilient seat means and said spherical plug member.

37. A ball/seat spacer as recited in claim 36, wherein: said first sealing surface is of conical configuration.

38. A ball/seat spacer as recited in claim 36, wherein: said first sealing surface is of concave spherical configuration.

39. A ball/seat spacer as recited in claim 36, wherein: said generally rigid ring defines an external groove engagable by a pry tool for imparting initial arcuate movement to said generally rigid ring during extraction movement thereof.

40. A ball/seat spacer as recited in claim 36, wherein: a resilient sealing element extends from said generally rigid integral spacer ring and is positioned for sealing engagement with the spherical sealing surface of said spherical plug member.

41. A ball/seat spacer as recited in claim 36, wherein: said generally rigid integral spacer ring defines precision machined axial extremities for metal-to-metal sealing with corresponding valve body and spherical plug member sealing surfaces in the event of destruction of said annular resilient seat means and the seal members of said top entry ball valve by excessive heat.

* * * * *